United States Patent [19]
Gerkey et al.

[11] 4,261,094
[45] Apr. 14, 1981

[54] HEAT EXCHANGER TUBE AND TUBE SHEET LOCATION SENSING DEVICE

[75] Inventors: Kenneth S. Gerkey, Mount Lebanon; Raymond P. Castner, Monroeville; Richard L. Stiller, Natrona Heights, all of Pa.

[73] Assignee: Westinghouse Electric Corp., Pittsburgh, Pa.

[21] Appl. No.: 952,430

[22] Filed: Oct. 18, 1978

[51] Int. Cl.³ .................. B21D 39/06; B21D 53/08
[52] U.S. Cl. ............................ 29/427; 29/157.3 C; 29/727
[58] Field of Search ............. 29/157.3 C, 157.3 R, 29/33 G, 33 T, 726, 727, 407

[56] References Cited
U.S. PATENT DOCUMENTS 3,718,017  2/1973  Blackburn ............ 29/726 X

*Primary Examiner*—Carl E. Hall
*Attorney, Agent, or Firm*—E. F. Possessky

[57] ABSTRACT

Apparatus and method for positioning either one of a pair of automatically controlled remote mechanisms for properly positioning the two opposed ends of a common heat exchanger tube within a tube sheet of a steam generator and having a tool for securing the tube therein. The apparatus includes a pair of microswitches precisely positioned closely adjacent the tool on each of said pair of mechanisms. The first switch is actuated upon initial engagement of the tube end and the tool to indicate which of the opposed tube ends is first engaged, and the second switch is actuated upon proper positioning of the tube end within the tube sheet. The method of operation is such that the tube end nearest the tube sheet of the two opposed tube ends to be engaged is the first tube end to be positioned and secured within the tube sheet.

4 Claims, 5 Drawing Figures

HEAT EXCHANGER TUBE AND TUBE SHEET LOCATION SENSING DEVICE

CROSS REFERENCE TO RELATED APPLICATIONS

This application is hereby cross-referenced to commonly-assigned application Ser. No. 752,431 filed concurrently herewith and entitled "Method and Apparatus for Servicing a Steam Generator" and to commonly assigned copending application Ser. No. 932,583, filed Aug. 10, 1978, now U.S. Pat. No. 4,178,787.

BACKGROUND OF THE INVENTION

1. Field of the Invention:

This invention relates to remotely disposed automatically operated mechanism for securing heat exchanger tube ends within the tube sheet of a steam generator, and more particularly, to switch means on such apparatus for sensing the presence of the tube ends on the apparatus and the proper positioning of the tube ends within the tube sheet.

2. Description of the Prior Art:

Retubing of a steam generator generally includes a procedure for initially placing the opposite ends of the U-shaped heat exchanger tubes substantially flush with the lower face of a tube sheet and then securing the tube ends to the tube sheet in this position.

In a typical steam generator such operation on a single tube end can be done manually and proper location is visually obtained using indexing or locating shoulders formed as a part of the tool securing the tube ends within the tube sheet. However, in the environment of an irradiated nuclear steam generator the manual procedure for securing the tube ends in the tube sheet has been replaced by automatic apparatus remotely disposed within the nuclear steam generator head such as more fully described in previously identified, commonly owned, U.S. Pat. No. 4,178,787, entitled "Remotely Operated Tube Expanding Tool and Support". Thus, in such environment, each tube has opposed ends projecting downwardly from the tube sheet on either side of the lower head divider plate. The automatic apparatus includes a tool support mechanism remotely disposed on each side of the divider plate, with each mechanism capable of moving the projecting adjacent tube end upwardly into proper position within the tube sheet prior to the operation of securing the tubes via a tool on the mechanism. Preferably, each mechanism is associated with the opposite ends of a common U-shaped heat exchanger tube. However, it is apparent that if each mechanism is disposed equidistantly below the tube sheet in axial alignment with the tube ends, and then raised into abutting engagement with the tube sheet to position the tube ends therewithin, unless the tube ends likewise project an equidistance from the tube sheet, both ends (because of stiffness of the heat exchanger tube) could move upwardly a distance equivalent to the upward axial movement of the furthest projecting end. This would result in the lesser extending end of the common tube being disposed upwardly in the tube sheet generally inaccessible to the tool for securing the tube and tube sheet together. Thus, the end of the tube which projects the least from the tube sheet must be initially moved into the proper position in the tube sheet and at least temporarily secured thereto, and the opposite end which will still be projecting somewhat from the tube sheet subsequent to this operation subsequently moved into proper position with the upward movement of this end accommodated by the resiliency of the upper bend of the U-shaped tube while the secured end remains in proper position in the tube sheet. The above-operational procedure is under the control of a servicing system and comprises only a part of the complete servicing system for controlling the operation of the remote apparatus for retubing the generator. The complete system is more fully described in concurrently filed, co-owned application Ser. No. 952,431 entitled "Method and Apparatus for Servicing a Steam Generator".

SUMMARY OF THE INVENTION

This invention provides a pair of miniature microswitches associated with the tube expander tool of each mechanism of a pair of generally tandemly operated mechanisms disposed in the channel head of a steam generator for providing relative position information to the control system for properly positioning the opposed ends of the heat exchanger tubes within the tube sheet and preliminarily securing the ends therein. The first microswitch (lower limit switch) has an actuating mechanism adjacent the tool mandrel so as to be actuated only by abutment with the tube end. The second microswitch (upper limit switch) has an actuating mechanism also adjacent the tool mandrel and so positioned as to be actuated only by abutment with the tube sheet upon proper positioning of the tube end therein. Thus, in operation as described in the above-identified concurrently-filed application, the tool in each mechanism is axially aligned below the opposite ends of a common heat exchanger tube which project from the lower face of the tube sheet. The mechanisms are uniformly elevated from a reference plane to lift the tube ends to within the tube sheet. Each tool is moved upwardly to engage a tube end, as indicated by actuation of each associated lower limit switch. After each lower limit switch is activated, the least protruding tube end is determined and positioning is contained on the least protruding tube end to dispose it within the tube sheet. After the closest tube end has been secured, elevation of the second mechanism continues until the upper position switch thereon is actuated indicating proper tube positioning within the tube sheet. This tube end is then secured by the tool within the tube sheet. Thus, the present invention provides microswitch actuating mechanisms adjacent the tool for indicating when each apparatus is in proper position abutting the tube end and when the tube end is in proper position within the tube sheet so the system can be operated in accordance with the above procedure.

DESCRIPTION OF THE PREFERRED EMBODIMENT

Figure 1:
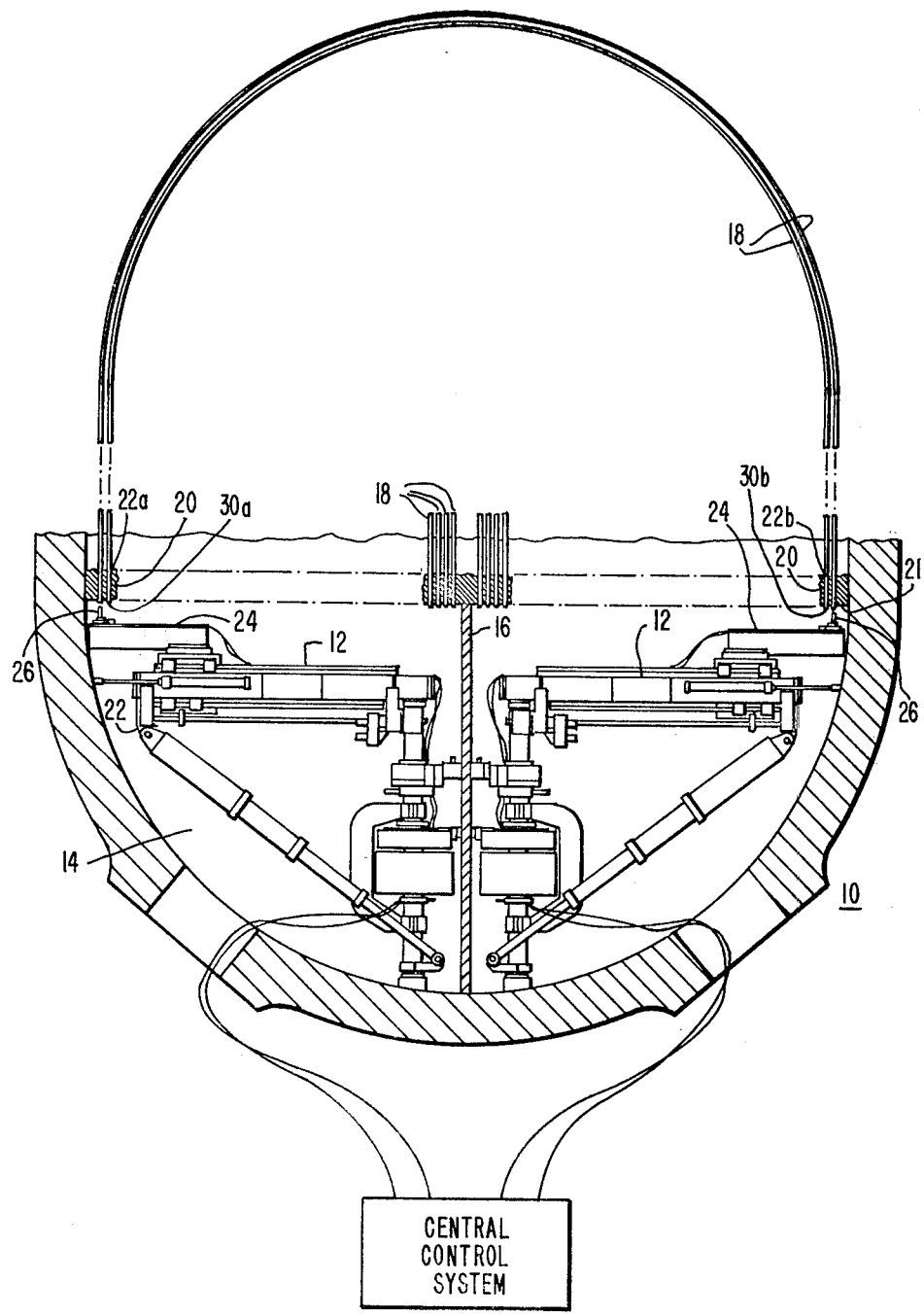
FIG. 1 is a schematic partial view of a portion of a nuclear steam generator with automatic tool positioning mechanisms remotely disposed therein.

Referring to FIG. 1, a portion of a steam generator 10 is shown having a pair of remotely operated automatic tool positioning mechanisms 12 temporarily mounted in the channel head 14, with each mechanism disposed on opposite sides of a divider plate 16. Such tool positioning mechanisms are employed to support various tools facilitating the removal and replacement of the U-shaped heat exchanger tubes 18 within the tube sheet 20. Such remotely operated mechanisms are more particularly described in commonly owned, copending patent applications Ser. No. 888,701 and Ser. No. 896,530, each of which is herein incorporated by reference to the extent the present invention requires a remotely disposed automatic tool positioning support apparatus. Further, the sequential or selective operation of each mechanism is under the control of a control system to operate in the manner more fully described in concurrently-filed, commonly-owned application Ser. No. 952,431, entitled "Method and Apparatus for Servicing a Steam Generator". To the extent such control and operation procedure is relevant to the instant invention, it too is herein incorporated by reference. However, it is to be understood that the tool supporting terminal end 22 of such mechanism can be raised to an elevated position and lowered from such position by a vertically movable extension 24 on which the specific tool 26 is mounted.

One of the operations in the retubing procedure is to secure the ends of the heat exchanger tubes generally flush with the lower face 21 of the tube sheet. Thus, each U-shaped tube 18 is lowered through intermediate guiding and supporting plates (not shown) to within appropriate apertures, such as 22a and 22b, of the tube sheet 20. It will be seen that opposite ends of the tubes 18 are on opposite sides of the generator lower head divider plate 16. Further, it is to be noted that the tube ends will extend through the tube sheet 20 to below the lower face 21 thereof. However, because of manufacturing and assembly tolerances, one end of the tube, such as 30a, may extend further below the tube sheet than its opposite end 30b. For purposes of illustration, assume tube end 30a extends one inch below the lower face 21 of the tube sheet 20 and tube end 30b extends one-half inch therebelow. Thus, because of the stiffness of the tube 18, raising the tube end 30a so as to be flush with the lower face 21 results in the tube 18 being elevated the necessary one inch. This would place the opposite end 30b one-half inch up into the tube sheet 20 and generally inaccessible for proper engagement by the tool 26 for securing the tube end 30b to the tube sheet. Thus, for automatic operation of the tool positioning apparatus 12, it is necessary for whichever tool 26 is disposed beneath the end of the tube 18 projecting the least from the lower face of the tube sheet 20 (such as end 30b in the above illustration), to be the first to be elevated to place that tube end in a flush position whereupon it can be at least preliminarily secured therein. This would result in the opposite, further extending, end still extending somewhat below the face 21, but subsequent elevation of the tool therebelow can raise the tube end (such as 30a) to its flush position with the resiliency of the U-bend in the tube accommodating this movement while the other end remains stationary from its initial securement.

Figure 2:
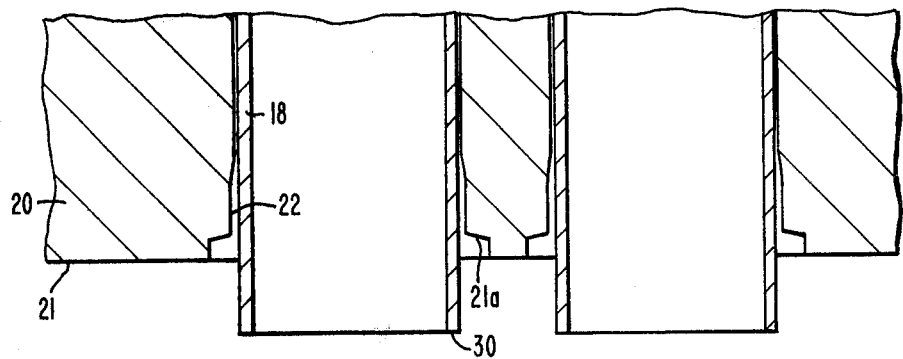
FIG. 2 is a cross-sectional elevational view of the terminal end of the above mechanism supporting a tool for securing the tube ends within the tube sheet and showing a microswitch and actuating mechanism of the present invention to indicate proper engagement between the tube end and the tool.
Figure 2:
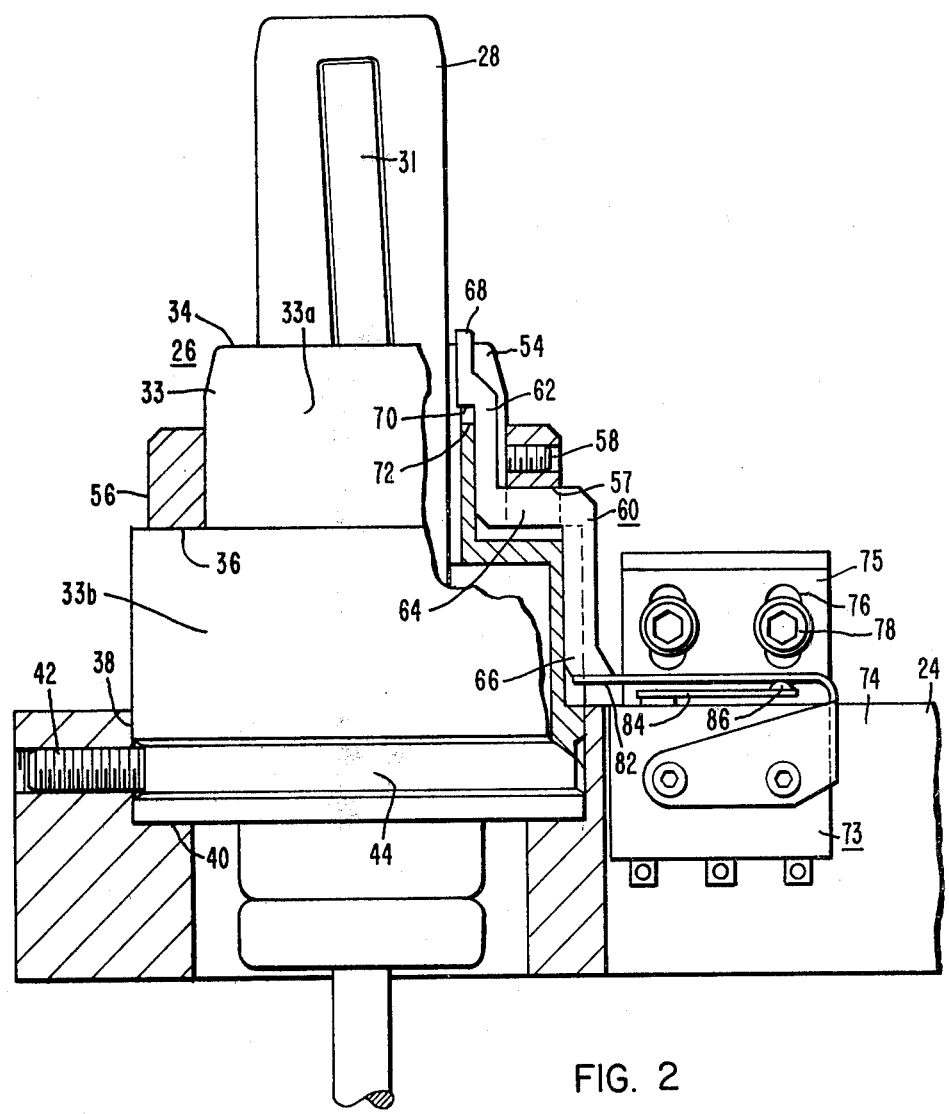

Thus referring to FIG. 2, the present invention is shown as an integral part of the tool 26 supported by the extension 24 used to elevate the tube ends generally flush with the tube face 21 and effectuate the preliminary attachment of the tube 18 to the tube sheet 20. Such tool 26 and the securing operation thereof is more fully described in copending, previously-identified commonly owned U.S. Pat. No. 4,178,787, entitled "Remotely Operated Tube Expanding Tool and Support".

As shown in FIG. 2, the tube end 30 extends somewhat below the lower face 21 of the tube sheet 20. A tube expander tool 26 is positioned (i.e. by the automatic positioning of the extension 24) to be in axial alignment therebelow. The expander tool 26 comprises a vertically oriented mandrel 28 housing a plurality of free rolling cylindrical rollers 31. The mandrel 28 and rollers 31 are sized to fit within the tube 18 and rotation of the mandrel causes rotation of the rollers on the inner face of the tube to expand the tube against the opening 22 through the tube sheet in a well-known manner. The mandrel 28 is housed within a cylindrical mounting block 33 having a horizontal planar upper annular surface 34 for engaging the tube end 30 when the mandrel 28 is positioned within the tube. The block 33 has a stepped cylindrical configuration providing a horizontal shoulder 36 between an upper cylindrical section 33a and a lower concentric cylindrical section 33b. The lower cylindrical section 33b is positioned in an aperture 38 and the terminal end of the extension 24 as seated on a shoulder 40, and a set screw 42 in extension 24 is screwed into engagement within a circumferential notch 44 to retain the tool 26 therein.

The upper cylindrical section 33a and the lower cylindrical section 33b each contain a first axially extending notch 50, 52 (more clearly shown in FIG. 4), respectively, in the outer surfaces thereof and in coaxial alignment. The upper portion of the notch 50 extends completely through the annular wall of the block 33 such as at 54. An annular collar member 56 is secured by a set screw 58 to the upper cylindrical portion 33a rests on the shoulder 36, and in cooperation with the notch 50, defines a horizontally extending aperture 57.

A crank-shaped actuating member 60 is disposed within the first notch 50, 52 and defnes a first leg 62 disposed in the upper notch 50 and confined therein by the collar member 56, an offset portion 64 extending through the horizontal notch 57 in the collar and a second leg 66 disposed in the lower notch 52. The upper terminal end 68 of the first leg 62 is inset, as at 70, to immediately adjacent the mandrel 28, and in the upwardly biased position shown, (in a manner to be described) extends a distance above the upper surface 34 of the cylindrical block 33. Further, it will be noted that in this upwardly biased position, the offset portion 64 is elevated from the shoulder 36 and also clearance is provided between the inset portion 70 and the lip 72 of the upper notch 54 to permit downward vertical movement of the member 60 when the upper face 68 abuts the end 30 of the U-bend tube 18 as will occur when the tool 26 is elevated to engage the tube as previously explained.

A microswitch 73 is mounted on the extension 24 in an aperture 74 closely adjacent the tool 26, as by a switch mounting plate 75 integrally attached to the switch 73, having vertically elongated apertures 76. A mounting block 80 (see FIG. 4) is secured to the extension 24 and adjustably supports the switch mounting plate 75 as through screws 78. The switch 73 includes a cantilevered spring arm 82 spaced above a cantilevered contact arm 84 having a contact 86 thereon. The terminal end of the spring arm 82 supports the crank member 60 in its elevated position, however upon the surface 68 of the member 60 abutting the end 30 of the tube which occurs only when the mandrel 28 is properly disposed within the tube 18, the spring 82 is lowered to a position causing actuation of the switch 73.

Figure 3:
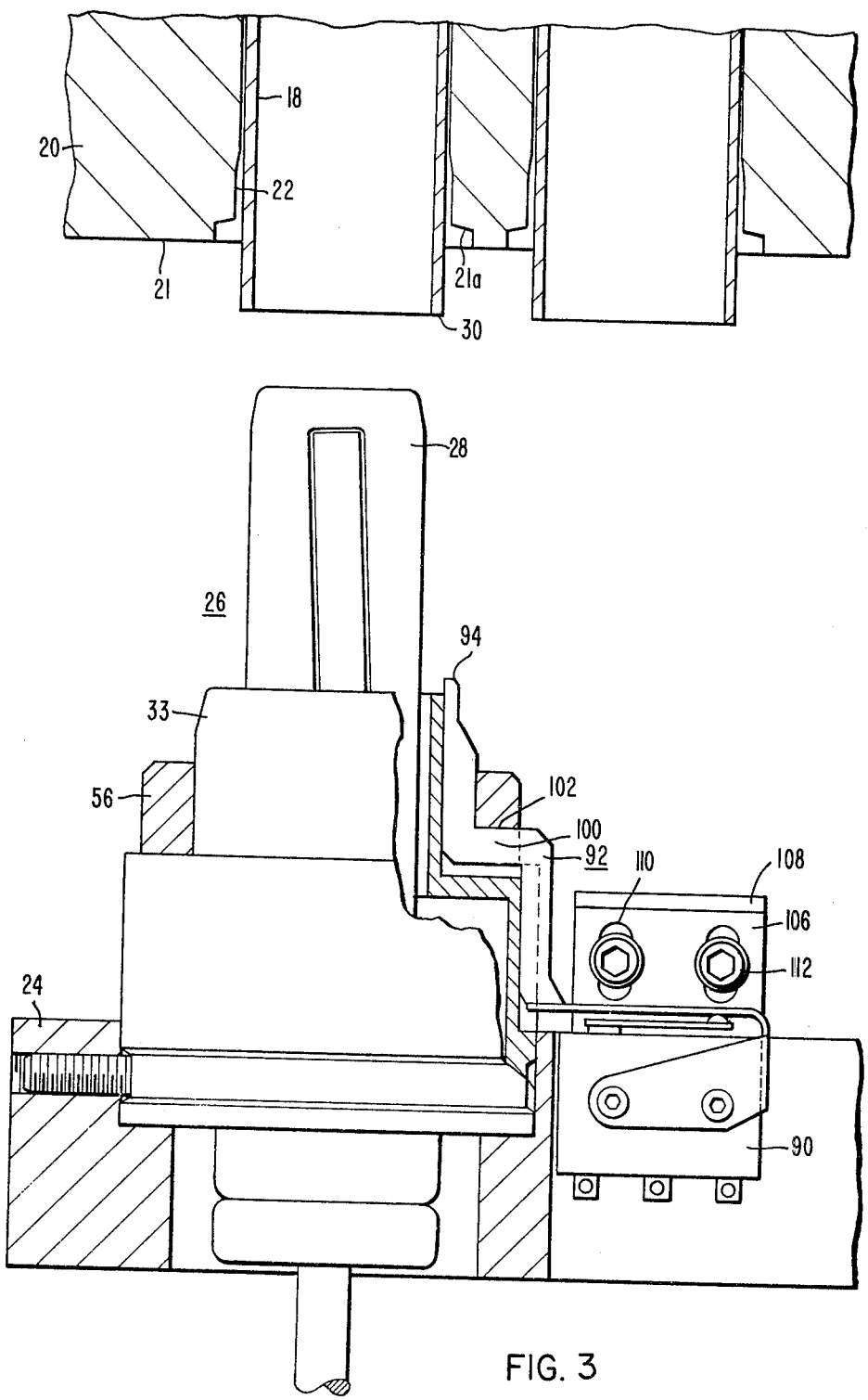
FIG. 3 is a view similar to FIG. 2 showing another microswitch and actuating mechanism of the present invention to indicate a proper positioning of the tube end and tool within the tube sheet.

Referring to FIG. 3, a similar microswitch 90 and switch actuating member 92 are shown; however, in this instance, the upper terminal surface 94 of the crank-shaped actuating member 92 is disposed radially outwardly from the mandrel 28a sufficient distance to permit the passage of the tube 18 therebetween, and as will be seen, is depressed upon such terminal end 94 abutting the tube sheet 20 within a spot face 21a concentric with the tube opening 22. As before, the crank-shaped actuating member 92 is disposed in a second vertical notch defined by axially aligned notches 96, 98 in the upper and lower cyylindrical portions 33a and 33b, respectively. The offset portion 100 of the member 92 is received within a horizontal notch 102 in the collar 56.

The microswitch 90, similar to switch 73, is mounted adjacent the tool 26 in the same manner as previously described and includes a spring arm 104 engaging the member 92 and normally supporting it in an elevated position whereupon lowering the member 92 by its contact with the tube sheet actuates the switch 90. Again, it is seen that the switch 90 is adjustably mounted through a switch mounting plate 106 to a mounting block 108 disposed on the extension 24 by virtue of vertically elongated openings 110 through the plate for receipt of screws 112 into the block 108.

Figure 4:
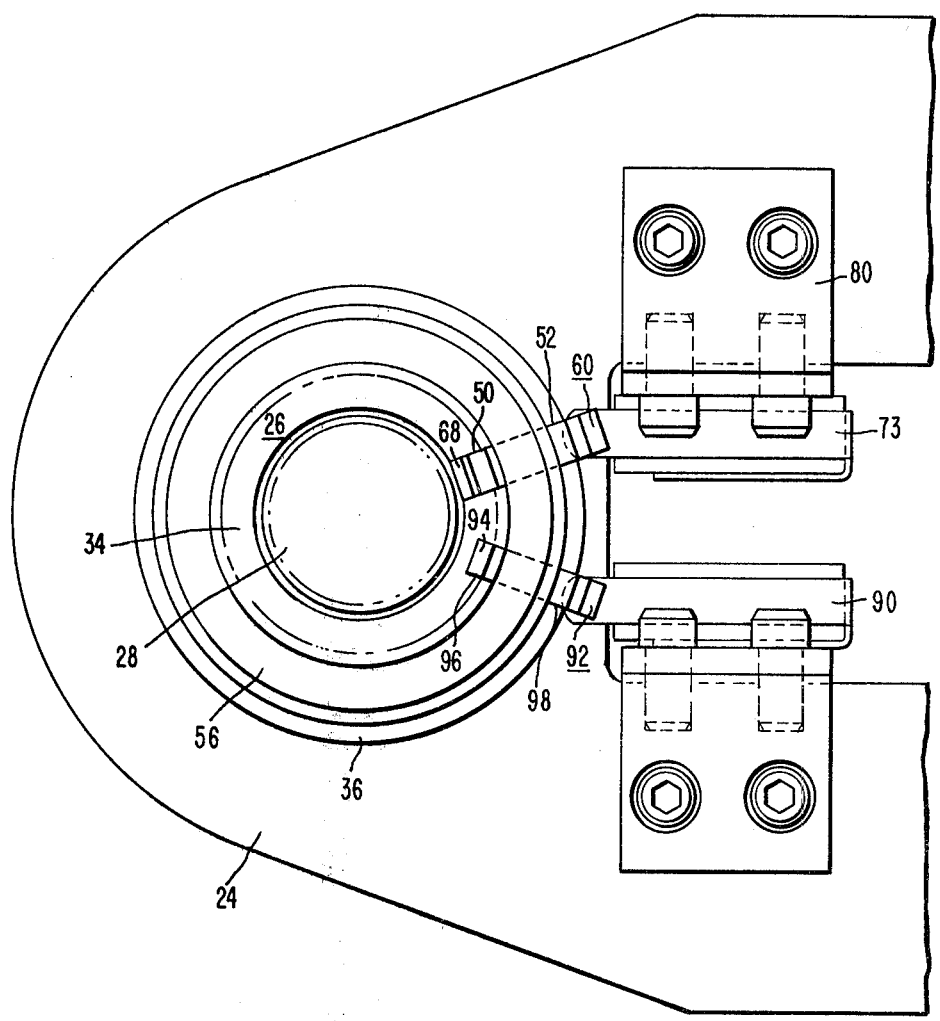
FIG. 4 is a top plan view of the tool showing the two microswitches of FIGS. 2 and 3; and, FIG. 5 is a control flowchart schematic showing the operation of the limit switches in the automatic positioning operation for remote operation of tube end sensing and positioning of same within the tube sheet.

Reference is made to FIG. 4 to show the relative position of each switch actuating member 60, 92, respectively, and each switch 73, 90, respectively, as mounted on the extension 24. It is therein seen that the first and second notches (the first notch comprising upper and lower notch 50, 52 and the second notch comprising upper and lower notch 96, 98) extend generally radially from the axis of the tool 26 (and the axis of the heat exchanger tube thereabove) and are angularly displaced from one another a short distance. The horizontal overlap between each actuating member and the spring arm eliminates any necessity for horizontal mounting adjustment.

Figure 5:
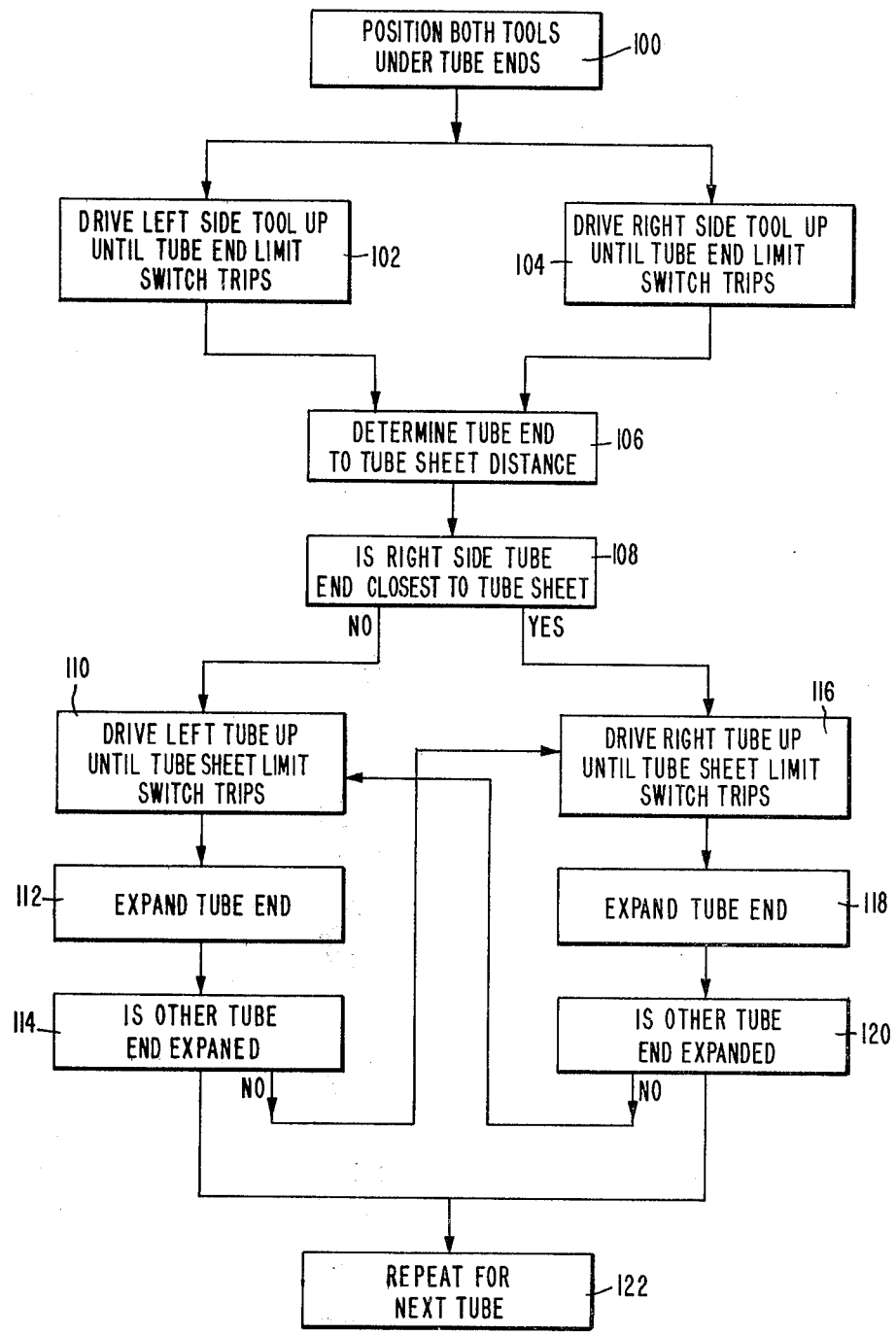

Reference is now made to the control flowchart schematic of FIG. 5 to show the operation for the selective elevation of the respective tool mechanisms to the proper position depending upon which end of the two opposed ends of the common heat exchanger tube extends the further below the tube sheet surface 21.

This flow chart is in accordance with the control system disclosed in the previously-identified concurrently-filed commonly-owned application Ser. No. 952,431 and is included in the description herein to illustrate the function of the switches in such system. More particularly, in FIG. 15 of the above-referenced application which has been herein incorporated by reference, a more complete flow chart is described. FIG. 5 herein is an abbreviated flow chart schematic of the steps shown therein and indicating in which steps the microswitches of the present invention function.

Thus, initially, as represented by block 100, both tools 26 are positioned in axial alignment below the opposite ends (e.g. left side and right side) of a common tube. The tool 26 on each machine is then elevated as represented by blocks 102, 104, until the mandrel 28 is within the tube 18 and the tube-end limit switch 73 is tripped. Upon each limit switch being tripped, the distance each tool is from the tube sheet can be determined, represented by block 106. Next, as in block 108, a determination is made as to which tool is closer to the tube sheet. If the left side tool is closer, the left tool is elevated, as in block 110, until the tube sheet limit switch 90 is tripped. The tube expander tool 26 then expands the tube represented by block 112, to secure it within the tube sheet. In block 114 a determination is made whether the other tube end has been expanded and since it has not, the right side tool is elevated, as in block 116, until its tube-sheet limit switch 90 is tripped. This tube end is then expanded by the tool 26, as in block 118, and a determination is again made whether the opposite tube end has been expanded, as in block 120, sicne it has, the procedure 15 advance to the next step 122 wherein the procedure is available to be repeated for the next tube. It is to be understood that had the right side tool been closer to the tube sheet on the above, operation would have proceeded first on the right side end of the tube.

What is claimed is:

1. An apparatus for accurately positioning and securing the opposite ends of a U-bent heat exchanger tube extending from a common face of a tubesheet to generally flush with said face wherein said apparatus includes two separately operable automatically operated tube end engaging and securing tools with each said tool being independently movable to a proper lifting engagement of the associated tube end by said tool;
  a pair of first signalling means, one each adjacent each said tool, for signalling said proper lifting engagement of each said tube end by said adjacent tool and determining the relative distance of each said tube end from said common face; and
  a pair of second signalling means, also one each adjacent each said tool, for signalling proper location of said associated tube end generally flush with said face;
  wherein said pair of first signalling means identifies the tube end projecting the lesser of the two from said common face for said apparatus to automatically move said so identified tube end into said proper location generally flush with said face as identified by said second signalling means associated therewith for securement of said end within said tubesheet by said tool prior to the remaining tube end being likewise positioned and secured within said tubesheet.

2. Structure according to claim 1 wherein each said tool comprises a generally cylindrical mandrel sized to closely fit within said tube end and extending above a planar shoulder encircling said mandrel and providing a tube end abutting and lifting surface; and wherein
  each said first signalling means comprises a first switch means having a contact arm normally biased to one operative position, and a first movable actuating member extending from said arm to adjacent said mandrel and in axial alignment with said tube end and extending above said surface a distance sufficient to move said arm to said signalling position in response to said tube end seating on said surface.

3. Structure according to claim 2 wherein each said second signalling means comprises a second switch means having a contact arm normally biased to one operative position, and a second movable actuating member extending from said arm of said second switch to a position radially outwardly from said mandrel a distance sufficient to allow the passage of said tube between said mandrel and said member and extending above said surface a distance sufficient to move said last named arm to a signalling position in response to said surface contacting said tube sheet.

4. Structure according to claim 3 wherein said common face comprises an inset spot face on said tube sheet encircling each said tube end projecting therethrough and wherein said second actuating member is in axial alignment with said spot face and sized to fit within said spot face when said mandrel is in axial alignment with said tube ends whereby said second switch arm is moved to said signalling position in response to said tube end being properly positioned flush with said spot face.

* * * * *